United States Patent
Farrell et al.

(10) Patent No.: US 10,370,487 B2
(45) Date of Patent: Aug. 6, 2019

(54) POLY(ESTER-CARBONATE) COPOLYMERS, ARTICLES FORMED THEREFROM, AND METHODS OF MANUFACTURE

(71) Applicant: SABIC GLOBAL TECHNOLOGIES B.V., Bergen Op Zoom (NL)

(72) Inventors: Tony Farrell, Bergen Op Zoom (NL); Paul Dean Sybert, Evansville, IN (US); James Alan Mahood, Evansville, IN (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 16/096,502

(22) PCT Filed: Apr. 28, 2017

(86) PCT No.: PCT/IB2017/052510
§ 371 (c)(1),
(2) Date: Oct. 25, 2018

(87) PCT Pub. No.: WO2017/187430
PCT Pub. Date: Nov. 2, 2017

(65) Prior Publication Data
US 2019/0112420 A1    Apr. 18, 2019

Related U.S. Application Data

(60) Provisional application No. 62/328,895, filed on Apr. 28, 2016.

(51) Int. Cl.
*C08G 63/64* (2006.01)
*C08K 5/13* (2006.01)

(52) U.S. Cl.
CPC ............. *C08G 63/64* (2013.01); *C08K 5/13* (2013.01)

(58) Field of Classification Search
USPC ................................................ 528/196, 198
See application file for complete search history.

(56) References Cited

U.S. PATENT DOCUMENTS

| | | | |
|---|---|---|---|
| 3,030,331 | A | 4/1962 | Goldberg |
| 4,189,549 | A | 2/1980 | Matsunaga et al. |
| 5,885,497 | A | 3/1999 | Maas et al. |
| 7,495,065 | B2 | 2/2009 | Kim et al. |
| 7,495,066 | B2 | 2/2009 | Balakrishnan et al. |
| 8,318,891 | B2 | 11/2012 | Balakrishnan et al. |
| 8,487,065 | B2 | 7/2013 | Mahood et al. |
| 2007/0123687 | A1 | 5/2007 | Balakrishnan et al. |
| 2008/0161507 | A1 | 7/2008 | Chakravarti et al. |
| 2010/0130700 | A1 | 5/2010 | De Brouwer et al. |
| 2011/0071261 | A1 | 3/2011 | Hoeks et al. |
| 2011/0152470 | A1 | 6/2011 | Meyer et al. |
| 2011/0256406 | A1 | 10/2011 | Farrell et al. |
| 2011/0288220 | A1 | 11/2011 | Benten et al. |
| 2011/0306707 | A1 | 12/2011 | Benten et al. |
| 2014/0179855 | A1 | 6/2014 | Farrell et al. |
| 2014/0295363 | A1 | 10/2014 | Sun et al. |

FOREIGN PATENT DOCUMENTS

| | | |
|---|---|---|
| DE | 10330722 A1 | 2/2005 |
| WO | 2013049967 A1 | 10/2011 |
| WO | 2013175448 A1 | 11/2013 |
| WO | 2014039645 A1 | 3/2014 |
| WO | 2014072923 A1 | 5/2014 |
| WO | 2014097196 A1 | 6/2014 |
| WO | 2017187424 A1 | 11/2017 |
| WO | 2017187427 A1 | 11/2017 |
| WO | 2017187428 A1 | 11/2017 |

OTHER PUBLICATIONS

International Search Report for International Application No. PCT/IB2017/052501, International Filing Date Apr. 28, 2017, dated Jul. 14, 2017, 5 pages.
International Search Report for International Application No. PCT/IB2017/052506, International Filing Date Apr. 28, 2017, dated Jul. 6, 2017, 5 pages.
International Search Report for International Application No. PCT/IB2017/052507, International Filing Date Apr. 28, 2017, dated Aug. 3, 2017, 6 pages.
International Search Report for International Application No. PCT/IB20171052510, International Filing Date Apr. 28, 2017, dated Jul. 6, 2017, 5 pages.
Written Opinion for International Application No. PCT/IB2017/052501, International Filing Date Apr. 28, 2017, dated Jul. 14, 2017, 5 pages.

(Continued)

*Primary Examiner* — Terressa Boykin
(74) *Attorney, Agent, or Firm* — Cantor Colburn LLP

(57) ABSTRACT

A poly(ester-carbonate) copolymer comprises carbonate units of the formula (I); and ester units of the formula (II) wherein: T is a $C_{2-20}$ alkylene, a $C_{6-20}$ cycloalkylene, or a $C_{6-20}$ arylene; and $R^1$ and J are each independently (a) a bisphenol A divalent group and (b) a $C_{16}$ or higher divalent group (b), wherein the $C_{16}$ or higher divalent group is present in an amount of 40 to 50 mol %; the ester units are present in an amount of 40 to 60 mol %; the poly(ester-carbonate) copolymer has a weight average molecular weight of 18,000 to 24,000 Daltons; and a sample of the composition has a glass transition temperature of 210° C. to 235° C. as determined by differential scanning calorimetry (DSC) as per ASTM D3418 with a 20° C./min heating rate; and a melt viscosity of less than 1050 Pa-s at 644 sec-1 and 350° C., determined according to ISO 11443.

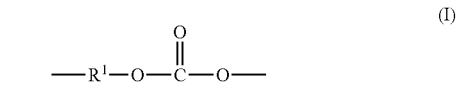

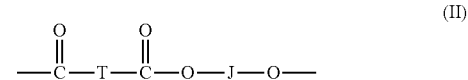

20 Claims, No Drawings

(56) References Cited

OTHER PUBLICATIONS

Written Opinion for International Application No. PCT/IB2017/052506, International Filing Date Apr. 28, 2017, dated Jul. 6, 2017, 6 pages.
Written Opinion for International Application No. PCT/IB2017/052507, International Filing Date Apr. 28, 2017, dated Aug. 3, 2017, 6 pages.
Written Opinion for International Application No. PCT/IB2017/052510, International Filing Date Apr. 28, 2017, dated Jul. 6, 2017, 5 pages.

POLY(ESTER-CARBONATE) COPOLYMERS, ARTICLES FORMED THEREFROM, AND METHODS OF MANUFACTURE

CROSS REFERENCE TO RELATED APPLICATIONS

This application is a National Stage application of PCT/IB2017/052510, filed Apr. 28, 2017, which claims the benefit of U.S. Provisional Application No. 62/328,895, filed Apr. 28, 2016, both of which are incorporated by reference in their entirety herein.

BACKGROUND

This disclosure is directed to poly(ester-carbonate) copolymers, thermoplastic compositions including the poly(ester-carbonate) copolymers, articles formed therefrom, and their methods of manufacture, and in particular high flow, high heat poly(ester-carbonate) copolymers and compositions and articles formed therefrom.

Polycarbonates are useful in the manufacture of articles and components for a wide range of applications, from automotive parts to electronic appliances. Because of their broad use, particularly in automotive, lighting and consumer electronics industries, it is desirable to provide polycarbonates having high heat capacities and good surface properties such as the ability to be metalized. In addition, many of these applications require thin wall thicknesses or high flow lengths. Accordingly, it is also desirable for these compositions to have good melt flow lengths (low melt viscosities) and good melt stability (lack of melt viscosity shift) at the processing conditions.

SUMMARY

A poly(ester-carbonate) copolymer comprises carbonate units of the formula

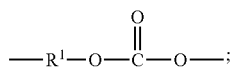

and ester units of the formula

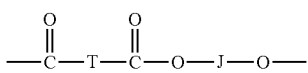

wherein:
T is a $C_{2-20}$ alkylene, a $C_{6-20}$ cycloalkylene, or a $C_{6-20}$ arylene; and
$R^1$ and J are each independently
(a) a bisphenol A divalent group of the formula

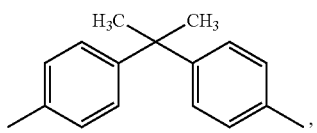

and
(b) a $C_{16}$ or higher divalent group (b) of the formula

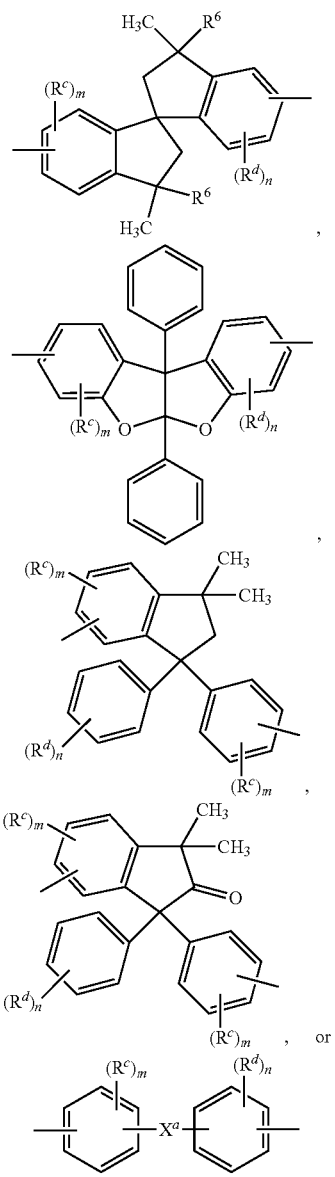

wherein
$R^c$ and $R^d$ are each independently a $C_{1-12}$ alkyl, $C_{2-12}$ alkenyl, $C_{3-8}$ cycloalkyl, or $C_{1-12}$ alkoxy,
each $R^6$ is independently $C_{1-3}$ alkyl or phenyl,
$X^a$ is a $C_{6-12}$ polycyclic aryl, $C_{3-18}$ mono- or polycycloalkylene, $C_{3-18}$ mono- or polycycloalkylidene, a $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1, and
m and n are each independently 0 to 4,
provided that
the $C_{16}$ or higher divalent group (b) is present in an amount of 40 mol % to 50 mol % based on the total moles of the bisphenol A divalent groups and the $C_{16}$ or higher divalent group;
the ester units are present in an amount of 40 mol % to 60 mol % based on the sum of the moles of the carbonate units and the ester units; and
wherein
the poly(ester-carbonate) copolymer has a weight average molecular weight of 18,000 Daltons to 24,000 Daltons, as measured by gel permeation chromatography, using a cross-linked styrene-divinylbenzene column and calibrated to bisphenol A homopolycarbonate references; and a sample of the composition has a glass transition temperature of 210° C. to 235° C. as determined by differential scanning calorimetry (DSC) as per ASTM D3418 with a 20° C./min heating rate; and a melt viscosity of less than 1050 Pa·s at 644 sec-1 and 350° C., determined according to ISO11443.

A method for the manufacture of the poly(ester-carbonate) copolymer includes providing a slurry comprising water, a water-immiscible organic solvent, a phase transfer catalyst, and bisphenol A; co-feeding to the slurry a solution comprising aqueous NaOH or aqueous KOH, an aromatic dicarboxylic halide of the formula

wherein T is a $C_{2-20}$ alkylene, a $C_{6-20}$ cycloalkylene, or a $C_{6-20}$ arylene, preferably a $C_{6-20}$ arylene, and a dihydroxy compound of the formula

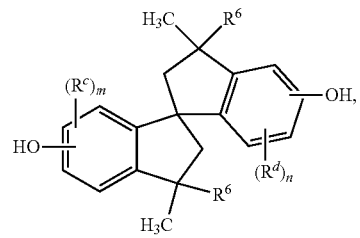

(9)

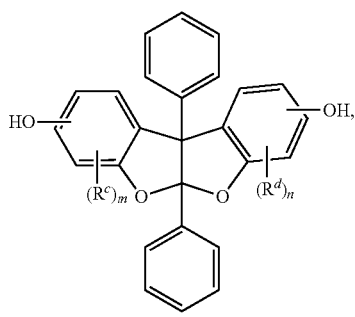

(10)

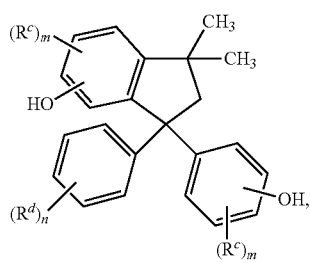

(11)

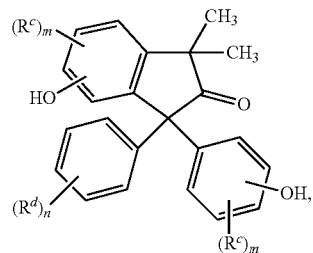

(12)

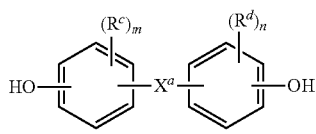

(13)

or a combination comprising at least one of the foregoing, wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, and m and n are each independently 0 to 4, to provide a polyester oligomer; and reacting the polyester oligomer with a carbonate source to provide the poly(ester-carbonate).

In another embodiment, disclosed is a thermoplastic composition comprising the poly(ester-carbonate).

In yet another embodiment, an article comprises the above-described poly(ester-carbonate) copolymer or thermoplastic composition.

In still another embodiment, a method of manufacture of an article comprises molding, extruding, or shaping the above-described poly(ester-carbonate) copolymer or thermoplastic composition into an article.

The above described and other features are exemplified by the following drawings, detailed description, examples, and claims.

DETAILED DESCRIPTION

The inventors hereof have discovered that in poly(ester-carbonate) copolymers formed from high heat monomers, careful selection of monomers in the ester units and the carbonate units, as well as the careful selection of relative percentage of the high heat monomer units and the ester units, and the weight average molecular weight of the poly(ester-carbonate) copolymers, can provide copolymers with high heat resistance, good surface properties, and desirable melt viscosity. The discovery allows the manufacture of compositions suitable for use in thin wall high flow articles with high thermal resistance and improved adhesion to metal.

Moreover, the poly(ester-carbonate) copolymers can be miscible with polycarbonate homopolymers or other poly(ester-carbonate) copolymers. Thus blends having low haze can be provided, which offers a flexibility to further tune the thermal resistance and other properties of the poly(ester-carbonate) copolymers.

The poly(ester-carbonate) copolymers, also known as polyester-polycarbonates, comprise carbonate units of formula (1)

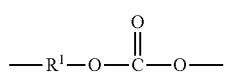

(1)

and ester units of formula (2)

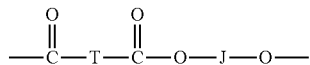
(2)

wherein the variables T, $R^1$ and J are further described below.

In formula (2), T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Preferably, T is a $C_{6-20}$ divalent aromatic group such as a divalent isophthaloyl group, a divalent terephthaloyl group, or a combination thereof. Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. Aliphatic dicarboxylic acid that can be used to prepare the polyester units include a linear $C_{6-20}$ aliphatic dicarboxylic acid (which includes a reactive derivative thereof), preferably a linear $C_6$-$C_{12}$ aliphatic dicarboxylic acid (which includes a reactive derivative thereof). Specific dicarboxylic acids include n-hexanedioic acid (adipic acid), n-decanedioic acid (sebacic acid), and alpha, omega-Cu dicarboxylic acids such as dodecanedioic acid (DDDA).

Further n formulas (1) and (2), $R^1$ and J are each independently (a) a bisphenol A divalent group and (b) a $C_{16}$ or higher divalent group derived from a specific high heat monomer as further described below. In an embodiment, $R^1$ and J each independently consist essentially, or consist of, (a) a bisphenol A divalent group and (b) a $C_{16}$ or higher divalent group derived from a specific high heat monomer as further described below.

As is known in the art, the bisphenol A divalent group (a) is of the formula

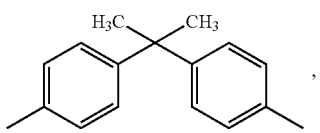

All or a portion of the $R^1$ groups can be the bisphenol A divalent groups, provided that at least a portion of the J groups are the $C_{16}$ or higher divalent group; or all portion of the J groups can be the bisphenol A divalent groups, provided that at least a portion of the $R^1$ groups are the $C_{16}$ or higher divalent group.

The $C_{16}$ or higher divalent group (b) is a divalent group of the formula (4), (5), (6), (16), or (17)

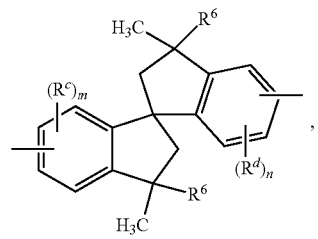
(4)

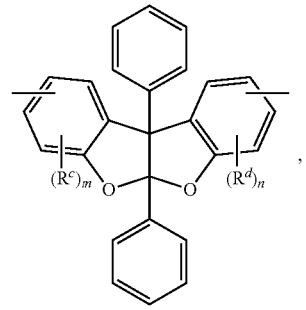
(5)

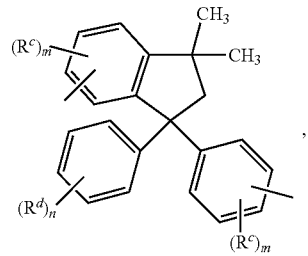
(16)

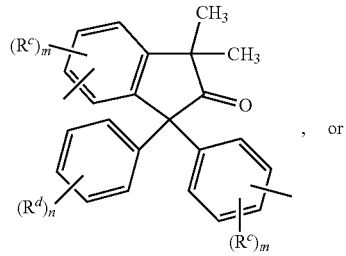
(17)
, or

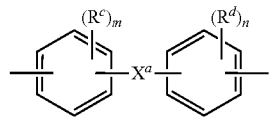
(6)

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, preferably methyl, $X^a$ is a $C_{6-12}$ polycyclic aryl, $C_{3-18}$ mono- or polycycloalkylene, a $C_{3-18}$ mono- or polycycloalkylidene, or a $-(Q^1)_x$-G-$(Q^2)_y$- group, wherein $Q^1$ and $Q^2$ are each independently a $C_{1-3}$ alkylene, G is a $C_{3-10}$ cycloalkylene, x is 0 or 1, y 1, and m and n are each independently 0 to 4. In formula (6), each bond to th polymer functional group is located a position para to the group $X^a$. A combination of different divalent groups (b) can be used. In an embodiment, at least one divalent group (b) is present in the ester groups of the poly(ester-carbonate) copolymer.

Exemplary $C_{16}$ or higher divalent groups (6) include the following:

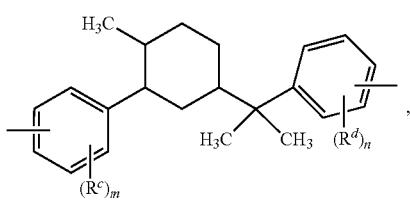
(6a)

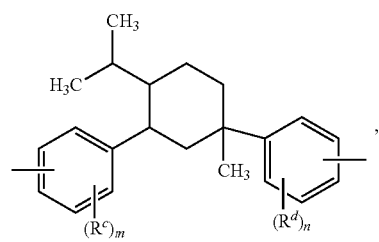
(6b)

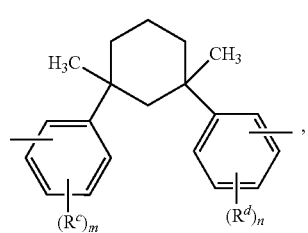
(6c)

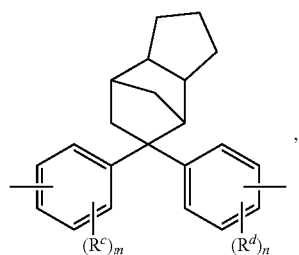
(6d)

(6e)

(6f)
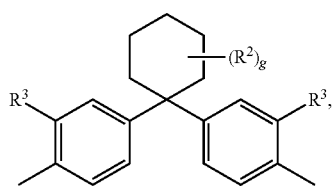

(6g)

(6h)

(6i)
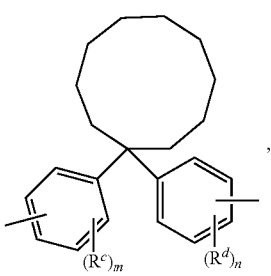

wherein $R^c$ and $R^d$ are the same as defined herein for formulas (4)-(6), (16), or (17), each $R^2$ is independently hydrogen or $C_{1-4}$ alkyl, m and n are each independently 0 to 4, each $R^3$ is independently $C_{1-4}$ alkyl or hydrogen, and g is 0 to 10. In a specific embodiment each bond of the divalent group is located para to the linking group that is $X^a$. Preferably, the $C_{16}$ or higher divalent group is derived from 1,1-bis(4-hydroxyphenyl)-3,3,5-trimethyl-cyclohexane (BP-TMC).

The $C_{16}$ or higher divalent group (b) is present in an amount of 40 mol % to 50 mol %, based on the total moles of the bisphenol A divalent groups (a) and the $C_{16}$ or higher divalent groups (b).

The ester units of the poly(ester-carbonate) copolymer are present in an amount of 40 mol % to 60 mol % based on the sum of the moles of the carbonate units and the ester units.

The poly(ester-carbonate) copolymers can be manufactured by processes such as interfacial polymerization and melt polymerization, which are known, and are described, for example, in U.S. Pat. Nos. 3,030,331; 4,189,549; 8,318,891; WO 2013/175448; and WO 2014/072923. Synthesis generally proceeds from the corresponding bisphenols, for example bisphenol A (7)

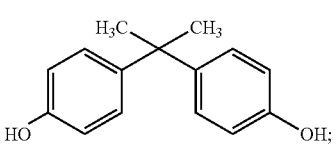
(7)

and bisphenols of formulas (9)-(13)
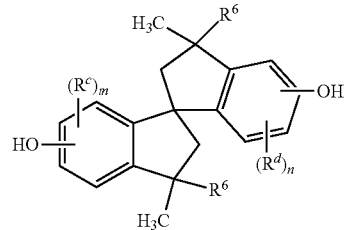
(9)
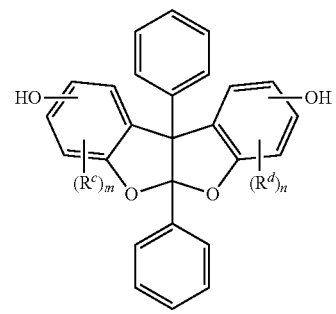
(10)
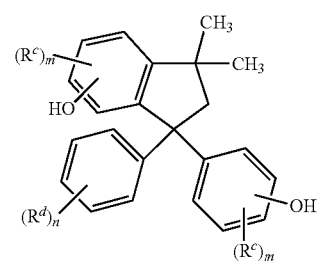
(12)
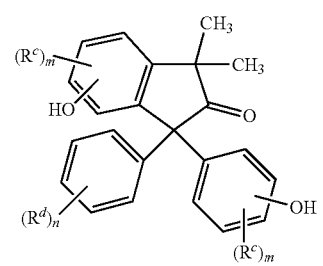
(13)
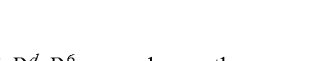
(11)
wherein $R^c$, $R^d$, $R^6$, m, and n are the same as defined herein for formulas (4)-(6), (16), and (17). Exemplary bisphenols of formula (11) include the following:
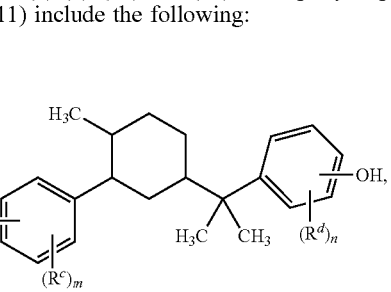
(11a)
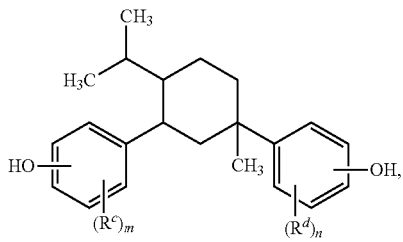
(11b)
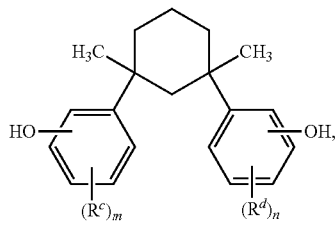
(11c)
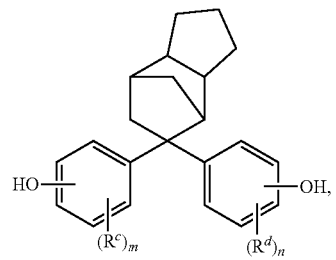
(11d)
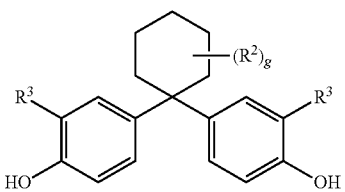
(11e)
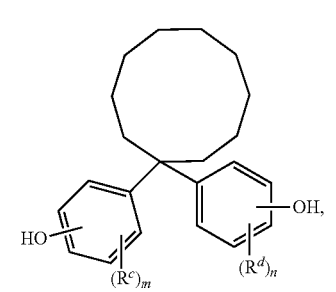
(11f)
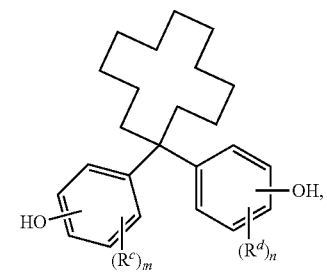
(11g)

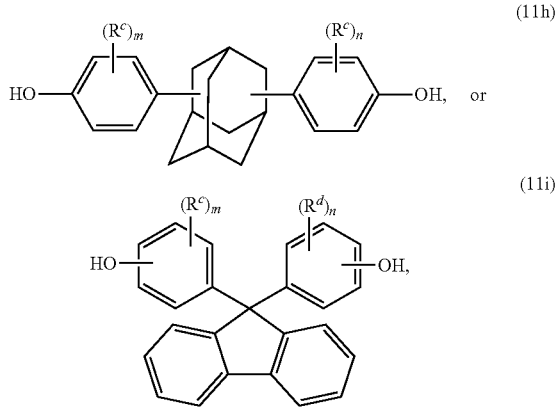

wherein $R^c$, $R^d$, $R^2$, $R^3$, g, m, and n are the same as defined herein for formulas (6a)-(6b). In a specific embodiment the $C_{16}$ or higher divalent group is derived from 1,1-bis(4-hydroxyphenyl)-3,3,5-trimethyl-cyclohexane, 1,1-bis(4-hydroxy-3-methylphenyl)cyclohexane, or a combination thereof.

The poly(ester-carbonate) copolymers, in particular the TMC/BPA poly(ester-carbonate)s can also be as described in U.S. Pat. No. 8,487,065, such as in Example 7. In particular, the poly(ester-carbonate)s can be manufactured by interfacial polymerization. Although the reaction conditions for interfacial polymerization can vary, an exemplary process generally involves dissolving or dispersing the dihydroxy compound and diacid compound in aqueous NaOH or KOH, adding the resulting mixture to a water-immiscible solvent, and contacting the reactants with a carbonate precursor in the presence of a catalyst such as, for example, a tertiary amine or a phase transfer catalyst, under controlled pH conditions, e.g., 8 to 10. Rather than using the dicarboxylic acid or diol directly, the reactive derivatives of the diacid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

The water-immiscible solvent can be, for example, methylene chloride, 1,2-dichloroethane, chlorobenzene, toluene, and the like. Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used.

The diaryl carbonate ester can be diphenyl carbonate, or an activated diphenyl carbonate having electron-withdrawing substituents on the each aryl, such as bis(4-nitrophenyl) carbonate, bis(2-chlorophenyl)carbonate, bis(4-chlorophenyl)carbonate, bis(methyl salicylate)carbonate, bis(4-methylcarboxylphenyl) carbonate, bis(2-acetylphenyl) carboxylate, bis(4-acetylphenyl) carboxylate, or a combination comprising at least one of the foregoing.

In some embodiments, the poly(ester-carbonate) copolymers are prepared by providing a slurry of bisphenol A and the phase transfer catalyst in a mixture of the water and water-immiscible organic solvent; and co-feeding the acid halide of the dicarboxylic acid, the dihydroxy compound of formula (9)-(13), or a combination comprising at least one of the foregoing, in a solution of caustic to provide polyester oligomers, which are then reacted with the carbonate precursor. In particular, the process includes combining bisphenol A in a water-immiscible organic solvent such as methylene chloride, and water in the presence of an endcapping agent as described below and a phase transfer catalyst such as triethylamine in a reactor. A caustic such as NaOH or KOH is added together with a solution of the dihydroxy compound of formulas (9)-(13) in caustic (e.g., aqueous NaOH or KOH), while a mixture of molten diacid halide derived from the corresponding dicarboxylic acid of T (e.g., isophthaloyl and terephthaloyl chloride) are concurrently added. Aqueous caustic can be added as needed to prevent the pH from decreasing below 8-9 in the reactor. After the additions are complete, a carbonyl source such as phosgene is added with sufficient aqueous caustic to maintain a pH of 8-9 in the reactor. The progress of the reaction is monitored (e.g., by GPC), and additional carbonyl source added as needed until the reaction has proceeded to the desired degree of completion. The resulting poly(ester-carbonate) copolymers can be isolated and purified by methods known in the art. For example, the poly(ester-carbonate) copolymers, can by purified on a centrifuge train where the brine phase is separated and the polymer solution in methylene chloride is extracted with aqueous HCl and then washed with deionized water until titratable chlorides are at a desired level, for example less than 50, or less than 5 ppm. The methylene chloride solution can then be steam precipitated and the polymer dried, for example under hot nitrogen, until the desired volatile levels are obtained, for example less than 1 wt. % or less than 0.4 wt %.

As described above, an end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumylphenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polymers can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl) isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt %.

n an embodiment, at least one divalent group (b) is present in the ester groups of the poly(ester-carbonate) copolymer. In some embodiments, $R^1$ and J are each independently the bisphenol A divalent group or the divalent group (b), and at least a portion of the J groups are the divalent group (b). For example, greater than 20 mol % and less than 35 mol % of the J groups can be the divalent group (b) based on the total moles of the J groups.

The poly(ester-carbonate) copolymer can comprise a carbonate linkage between two of the divalent groups (b) in an amount of greater than 15 mol % and less than 50 mol % based on the total moles of the carbonate linkages as determined by carbon-13 nuclear magnetic resonance spectroscopy ($^{13}$C NMR). The poly(ester-carbonate) copolymer can also comprise a carbonate linkage between two of the divalent groups (b) in an amount of greater than 15 mol % and less than 40 mol % based on the total moles of the carbonate linkages as determined by $^{13}$C NMR.

In another embodiment, the poly(ester-carbonate) copolymers can comprise a carbonate linkage between a bisphenol A divalent group (a) and a divalent group (b) in an amount of greater than 20 mol % and less than 60 mol % based on the total moles of the carbonate linkages as determined by $^{13}$C NMR. The poly(ester-carbonate) copolymer can also comprise a carbonate linkage between a bisphenol A divalent group (a) and a divalent group (b) in an amount of greater than 30 mol % and less than 50 mol % based on the total moles of the carbonate linkages as determined by $^{13}$C NMR.

The poly(ester-carbonate) copolymers can have a weight average molecular weight of 18,000 to 24,000 Daltons, as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute.

The poly(ester-carbonate) copolymers can have flow properties useful for the manufacture of thin articles. Melt volume flow rate (often abbreviated MVR) measures the rate of extrusion of a thermoplastic through an orifice at a prescribed temperature and load. The poly(ester-carbonate) copolymers useful for the formation of thin articles can have an MVR of 10 to 30 cm$^3$/10 minutes, preferably 15 to 25 cm$^3$/10 minutes, measured at 337° C. under a load of 6.7 kg in accordance with ASTM D1238-04.

The poly(ester-carbonate) copolymers at a given temperature such as 350° C., can have a melt viscosity of less than 1050 Pa·s at 644 sec$^{-1}$ or less than 1000 Pa·s at 644 sec$^{-1}$ and can have a shift in melt viscosity of less than 25% at that temperature over 30 min under a nitrogen atmosphere as measured in a small amplitude oscillatory time sweep rheology at a fixed angular frequency of 10 radians/sec, where the melt viscosity is determined in accordance with ISO11443.

The poly(ester-carbonate) copolymers can have a high glass transition temperature (Tg). The Tg of the poly(ester-carbonate) copolymers can be 210 to 235° C. or 220 to 235° C., determined by differential scanning calorimetry (DSC) as per ASTM D3418 with a 20° C./min heating rate.

The poly(ester-carbonate) copolymers can have high heat resistance. The heat deflection temperature (HDT) of the poly(ester-carbonate) copolymers is 175 to 225° C., preferably 200 to 225° C., measured on a 3.18 mm bar at 0.45 MPa according to ASTM D648.

The poly(ester-carbonate) copolymers can have high Vicat softening temperature. In an embodiment, the poly(ester-carbonate) copolymers have a Vicat B120 of 200 to 225° C., preferably 220 to 225° C., measured according to ISO 306.

The poly(ester-carbonate) copolymers can have excellent metallization properties. In an embodiment, a metalized sample of the poly(ester-carbonate) copolymer has a defect onset temperature that is within 20 degrees Celsius of the heat deflection temperature of the poly(ester-carbonate) copolymer where the HDT is measured flat on a 80×10×4 mm bar with a 64 mm span at 0.45 MPa according to ISO 75/Bf. In another embodiment, a metalized sample of the poly(ester-carbonate) copolymer has a defect onset temperature that is within 10 degrees Celsius of the heat deflection temperature of the poly(ester-carbonate) copolymer where the HDT is measured flat on a 80×10×4 mm bar with a 64 mm span at 0.45 MPa according to ISO 75/Bf.

The poly(ester-carbonate) copolymers can have a defect onset temperature of 200° C. or greater. In an embodiment, the poly(ester-carbonate) copolymers have a defect onset temperature of 200° C. to 220° C.

The poly(ester-carbonate) copolymers can have a visual transmission (Tvis) of 80% to 90% measured on HAZE-GUARD plus from BYK-Gardner instruments.

The poly(ester-carbonate) copolymers can have a yellowness index of less than 18 determined according to ISO 306.

The poly(ester-carbonate) copolymers can further have a Notched Izod Impact of 5 to 10 KJ/m$^2$, determined in accordance with ISO 180 under a load of 5.5 J at 23° C. on a sample of 3 mm thickness.

Also disclosed are thermoplastic compositions comprising the poly(ester-carbonate). In addition to the poly(ester-carbonate), the thermoplastic compositions can further comprise a polycarbonate homopolymer such as a bisphenol A homopolycarbonate, a copolycarbonate, a second poly(ester-carbonate) that is different from the poly(ester-carbonate), or a combination comprising at least one of the foregoing. The poly(ester-carbonate) copolymer can be present in an amount of 10 wt % to 90 wt % and the polycarbonate homopolymer, the copolycarbonate, the second poly(ester-carbonate) different from the poly(ester-carbonate) or a combination thereof can be present in an amount of 1 wt % to 90 wt %, each based on the total weight of the thermoplastic composition.

The homopolycarbonate and the copolycarbonate can comprise carbonate units of formula (12)

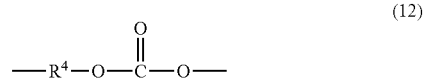

(12)

wherein at least 60 percent of the total number of R$^1$ groups are aromatic, or each R$^1$ contains at least one C$_{6-30}$ aromatic group. In an embodiment, each R$^1$ can be derived from a dihydroxy compound such as an aromatic dihydroxy compound of formula (13) or a bisphenol of formula (14).

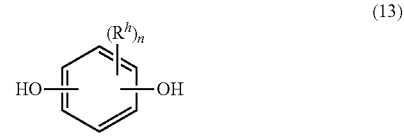

(13)

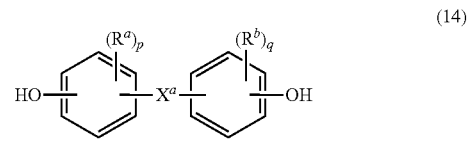

(14)

In formula (13), each R$^h$ is independently a halogen atom, for example bromine, a C$_{1-10}$ hydrocarbyl group such as a C$_{1-10}$ alkyl, a halogen-substituted C$_{1-10}$ alkyl, a C$_{6-10}$ aryl, or a halogen-substituted C$_{6-10}$ aryl, and n is 0 to 4. In formula (14), R$^a$ and R$^b$ are each independently a halogen, C$_{1-12}$ alkoxy, or C$_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, preferably methyl, disposed meta to the hydroxy group on each arylene group. $X^a$ in formula (14) is a bridging group connecting the two hydroxy-substituted aromatic groups, where the bridging group and the hydroxy substituent of each $C_6$ arylene group are disposed ortho, meta, or para (preferably para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group. Some illustrative examples of dihydroxy compounds that can be used are described, for example, in WO 2013/175448 A1, US 2014/0295363, and WO 2014/072923. Specific dihydroxy compounds include resorcinol, BPA, and 2-phenyl-3,3'-bis(4-hydroxyphenyl) phthalimidine (PPPBP).

In an embodiment, the polycarbonate is a BPA homopolymer. In another embodiment, the polycarbonate is a copolycarbonate comprising bisphenol A carbonate units and additional carbonate units derived from a high heat monomer such as a bisphenol of formulas (8)-(11), (16), or (17), including formula (11a)-(11i). Examples of such copolycarbonates include copolycarbonates comprising bisphenol A carbonate units and 2-phenyl-3,3'-bis(4-hydroxyphenyl) phthalimidine carbonate units (a BPA-PPPBP copolymer, commercially available under the trade name XHT from SABIC).

The second poly(ester-carbonate) different from the poly(ester-carbonate) described above can further contain, in addition to recurring carbonate units (12), repeating ester units of formula (15)

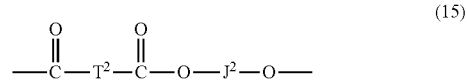
(15)

wherein $T^2$ is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. Aliphatic dicarboxylic acids that can be used include $C_{6-20}$ aliphatic dicarboxylic acids (which includes the terminal carboxyl groups), preferably linear $C_{8-12}$ aliphatic dicarboxylic acid such as decanedioic acid (sebacic acid); and alpha, omega-$C_{12}$ dicarboxylic acids such as dodecanedioic acid (DDDA). Preferred dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Further in formula (15), $J^2$ is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, preferably, 2, 3, or 4 carbon atoms. Specific dihydroxy compounds for use in the second poly(ester-carbonate) include an $C_{1-8}$ aliphatic diol such as ethane diol, n-propane diol, i-propane diol, 1,4-butane diol, 1,6-cyclohexane diol, 1,6-hydroxymethylcyclohexane; an aromatic dihydroxy compounds of formula (13) such as resorcinol; or a bisphenol of formula (14), such as bisphenol A.

Second poly(ester-carbonate)s containing a combination of different $T^2$ or $J^2$ groups can be used. The polyester units can be branched or linear. Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the second poly(ester-carbonate)s can vary broadly, for example 1:99 to 99:1, preferably, 10:90 to 90:10, more preferably, 25:75 to 75:25, or from 2:98 to 15:85. In some embodiments the molar ratio of ester units to carbonate units in the second poly(ester-carbonate)s can vary from 1:99 to 30:70, preferably 2:98 to 25:75, more preferably 3:97 to 20:80, or from 5:95 to 15:85.

The thermoplastic compositions can include various additives ordinarily incorporated into polymer compositions of this type, with the proviso that the additive(s) are selected so as to not significantly adversely affect the desired properties of the thermoplastic composition, in particular melt flow, thermal, and surface properties. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt %, based on the total weight of the thermoplastic composition.

The thermoplastic compositions can be manufactured by various methods known in the art. For example, powdered poly(ester-carbonate), and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

The thermoplastic composition has a haze of less than 15% and a transmission greater than 75%, each measured using the color space CIE1931 (Illuminant C and a 2° observer) at a 3.2 mm thickness.

The thermoplastic composition has an MVR of 5 to 30, preferably 10 to 30, more preferably 18 to 28 $cm^3/10$ minutes, measured at 337° C. under a load of 6.7 kg in accordance with ASTM D1238-04.

The thermoplastic composition at a given temperature such as 350° C. or 370° C., has a melt viscosity of less than 1050 Pa·s at 644 $sec^{-1}$ and has shift in melt viscosity of less than 25% at that temperature over 30 min under a nitrogen atmosphere as measured in a small amplitude oscillatory time sweep rheology at a fixed angular frequency of 10 radians/sec, where the melt viscosity is determined in accordance with ISO11443.

The thermoplastic composition has a heat deflection temperature (HDT) of 195 to 225° C., measured flat on a 80×10×4 mm bar with a 64 mm span at 0.45 MPa according to ISO 75/Bf.

The thermoplastic composition has excellent metallization properties. In an embodiment, a metalized sample of the thermoplastic composition has a defect onset temperature that is within 20 degrees Celsius, preferably within 10 degrees Celsius of the heat deflection temperature of the poly(ester-carbonate) copolymer where the HDT is measured flat on a 80×10×4 mm bar with a 64 mm span at 0.45 MPa according to ISO 75/Bf.

Shaped, formed, or molded articles comprising the poly (ester-carbonate) copolymers or the thermoplastic compositions are also provided. The copolymers and compositions can be molded into useful shaped articles by a variety of methods, such as injection molding, extrusion, rotational molding, blow molding, and thermoforming. Some example of articles include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. Additional exemplary articles include a plug, a plug housing, a switch, an electrical conductor, a connector, an electric board, a lamp holder, a lamp cover, a lamp bezel, a reflector, a signal indicator, glazing, a lens, a lens holder, a waveguide element, a collimator, a light emitting diode, a diffuser sheet, a safety pane, a film, a film laminate, a safety goggle, and a visor.

The article comprising the poly(ester-carbonate) copolymers or the thermoplastic compositions can be a metallized article. The metallized article comprises, for example, a substrate comprising the poly(ester-carbonate) copolymers, the polycarbonate blends, or thermoplastic compositions, with a metal layer disposed on the at least one side of the substrate.

The substrate can be for example, a film. The substrate can be made by molding the poly(ester-carbonate) copolymers or the thermoplastic compositions. The molding methods are not particularly limited, and various known molding methods can be listed, for example, injection molding, gas assist injection molding, vacuum molding, extrusion, compression molding, calendaring, rotary molding, etc. Of these, molding is usually carried out by injection molding.

The metal layer can be disposed onto the surface of the substrate with the aid of electrocoating deposition, physical vapor deposition, or chemical vapor deposition or a suitable combination of these methods. Sputtering processes can also be used. The metal layer resulting from the metallizing process (e.g., by vapor deposition) can be 0.001 to 50 micrometers (μm) thick.

A base coat can be present between the substrate and the metal layer. However, it is advantageous to form the metal layer directly on the substrate surface without forming an undercoat. The surfaces of the substrate are smooth and good gloss can be obtained even by direct metal vapor deposition without treating the substrate with primer. Moreover, the release properties of the molded substrate during injection molding are good. Accordingly, the surface properties of the molded substrate are superior without replication of mold unevenness.

Chrome, nickel, aluminum, etc. can be listed as examples of vaporizing metals. Aluminum vapor deposition is used in one embodiment as metal vapor deposition. The surface of the molded substrate can be treated with plasma, cleaned, or degreased before vapor deposition in order to increase adhesion.

The metallized article can have a protective layer disposed on the metal layer. "Protective layer" refers for example, to a layer which is made of a binder or a high molecular weight polymer and formed on the outermost (e.g., the UV blocking) layer, so as to exert the effects of preventing marring and improving mechanical properties of the multilayer article. The protective layer can be clear or pigmented and be formulated, for example, with nitrocellulose or synthetic polymers configured to quickly dry by evaporation without chemical reaction with the layer on which they are disposed, providing a solid protective layer. The protective coating material can further be thinned with alcohols. In certain applications, the thickness of the protective layer is minimized. The thickness of the protective layer can be, for example, 0.2 μm or less.

The metallized articles can have little mold shrinkage, have good surface gloss even when metal layers are directly vapor deposited, and the vapor deposited surfaces do not become cloudy or have rainbow patterns even on heating of the vapor deposited surface. In particular, the metallized article can have no surface defects visible to the eye.

Illustratively, the metallized article has a metallized surface, wherein the surface can exhibit a gloss of greater than 95 units, or greater than 170 units, measured at 20 degrees using a trigloss meter. The metallized surface can also retain 85%, 88%, 90%, 95% or more of its gloss after heat aging at 150° C. for 1 hour, measured at 20 degrees using a micro trigloss meter. A base coat (undercoat) can be present between the article and the metallized surface, or a surface of the article can be directly metallized.

Metallized articles have applications in optical reflectors and can be used for automotive headlamps, headlight extensions, and headlamp reflectors, for indoor illumination, for vehicle interior illumination and for the like.

EXAMPLES (PROSPECTIVE)

The chemicals that are used in the Examples are described in Table 1.

TABLE 1

| Component | Chemical description | Source |
|---|---|---|
| BPA | Carbonate or ester units derived from Bisphenol A | SABIC |
| TMC | Carbonate or ester units derived from 1,1-bis(4-hydroxyphenyl)-3,3,5-trimethyl-cyclohexane | SABIC |

TABLE 1-continued

| Component | Chemical description | Source |
| --- | --- | --- |
| PEI | Polyetherimide | SABIC |
| PES | Polyethersulfone, ULTRASON E2010 PES | BASF |
| Hindered phenol | Octadecyl-3-(3,5-di-tert-butyl-4-hydroxyphenyl) propionate | BASF |
| Phosphite stabilizer | Tris(di-t-butylphenyl)phosphite | BASF |
| Lubricant | Pentaerythritol tristearate | |

Blending, Extrusion, and Molding Conditions

All the formulations are dry blended with the appropriate additives, if any, and mixed in a paint shaker. The blends are extruded on 26 mm twin-screw (T8) extruder with barrel temperatures set points ramped from 540 to 640° F. (feed to die throat), vacuum venting and a screw speed of 300 rpms. The extrudate is cooled in a water bath and then chopped into pellets for testing and molding. It will be recognized by one skilled in the art that the method is not limited to these processing steps or processing equipment.

Molding of ASTM Test Parts

A 180-ton injection molding machine with a 5.25 oz. barrel is used to mold ASTM test samples. The polymer blends are molded at 630 to 640° F. after drying for 4 hours and at 250° F. with a 35 sec cycle time. An oil-thermolator is used to heat cavity and core sides of the mold to a surface temperature of 250° F.

Testing Methods.

Weight average molecular weight (Mw) determinations are performed using GPC using a cross linked styrene-divinyl benzene column, at a sample concentration of 1 milligram per milliliter, and as calibrated with bisphenol A homopolycarbonate standards. Samples are eluted at a flow rate of 1.0 ml/min with methylene chloride as the eluent.

Metallization is performed on molded parts from a film gate injection set-up having dimensions 60 mm×60 mm and a thickness of either 3 mm or 1.5 mm using the physical vapor deposition (PVD) process. The process deposited a 100 to 150 nm thick aluminum layer onto one side of the molded part under vacuum, followed by a protective plasma-deposited siloxane hard-coat of 50 nm.

"Defect onset temperature" (DOT) is determined as the highest temperature at which no visual defects appeared on a metallized sample after 1 hour of heat aging in an air circulating oven, exposing all sides of the sample (symmetric heating). The thermal treatment of the metallized samples is carried out at least 48 hours after the parts are metallized.

The reflection data of the metallized articles and the heat treated metallized articles is acquired on an X-rite I-7 spectrophotometer according to ASTM D1003-00 using a 25 mm aperture under D65 illumination in specular reflection mode and 10 degrees observer.

Visual defects are measure by eye with a trained operator and by an increase in L*. There are two common modes of failure during thermal treatment of the metallized parts. The parts can become hazy with the result that these parts exhibit an increase in diffuse reflection, which can be measured as an increase in L* when the parts are measured in reflection mode under specular excluded conditions. The parts can also fail due to blistering, which may not give a significant increase in diffuse reflection but is determined by close inspection of the parts. Hence a failure is reported as "defect onset temperature" (DOT) and captures the temperature at which the heat treated part fails either the visual assessment or gives a high diffuse scattering i.e. high L* in specular reflection mode.

Melt volume rate ("MVR") is determined in accordance with ASTM D1238-04 under a load of 6.7 kg at 337° C. under a load of 5 Kg at 340 C.

Melt viscosity is determined in accordance with ISO 11443 at the temperatures indicated.

Glass transition temperature (Tg) is determined by differential scanning calorimetry (DSC) as per ASTM D3418 with a 20° C./min heating rate.

Heat deflection temperature (HDT) is determined on a flat 80×10×4 mm bar with a 64 mm span according to ISO 75/Bf, at the pressures indicated.

Heat deflection temperature is also determined on one-eighth inch 3.18 mm bars per ASTM D648, at the pressures indicated.

Vicat B value is determined according to ISO 306, Method B120.

Yellowness index is determined in accordance with ASTM D1925. Transparency is described by two parameters, percent transmission and percent haze. Percent transmission and percent haze for laboratory scale samples are determined in accordance with ASTM D1003 using the color space CIE1931 (Illuminant C and a 2° observer) at a 3.2 mm thickness.

"Mole % TMC" or "TMC mol %" refers to the sum of the molar percent of carbonate and ester units derived from BP-TMC based on the total moles of the carbonate and ester units. Mole % TMC can be determined by NMR.

"Mole % BPA" or "BPA mol %" refers to the sum of the molar percent of carbonate and ester units derived from BPA based on the total moles of the carbonate and ester units. Mol % BPA can be determined by NMR.

"Mole % ester" or "ester mol %" refers the molar percent of ester units based on the total moles of the ester units and carbonate units. Mole % ester can be determined by NMR.

Preparation of Poly(Ester-Carbonate) Copolymer (Example Process A)

The TMC/BPA poly(ester-carbonate)s are prepared according the following general procedure. The amounts are adjusted according to the desired composition and Mw. To a mixture of methylene chloride (24 L), DI water (6 L), bisphenol A (1567 g, 6.865 mol), p-cumylphenol (168.7 g, 0.7946 mol), triethylamine (40 ml), and sodium gluconate (10 g) in a 75 L reactor equipped with mechanical stirring, recirculation line with pH probe, subsurface phosgene addition, chilled glycol condenser, caustic scrubber for exit gas, and caustic solution inlet is added at 760 g/min a solution of BP-TMC (2300 g, 5.73 mol) in 1488 g of 33% NaOH and 387 8 g of DI water while a mixture of molten diacid chlorides (1342 g, 6.611 mol of 50/50 isophthaloyl and terephthaloyl chloride) are concurrently added at 90 g/min. Aqueous caustic (33 wt %) is added as needed to prevent the pH from decreasing below 8-9 in the reactor. After the additions are complete, the reactor is stirred for 5 min. Phosgene (1800 g, 18.1 mol) is added at 80 g/min and 33 wt % aqueous caustic is added as needed to maintain pH of 8-9 in the reactor. The reactor is then purged with nitrogen. A sample is removed for GPC analysis. Then 200 g of additional phosgene is added to the batch followed by a second GPC analysis. If the difference between the first and second GPC is less than 200 the batch is considered complete. If not the process is repeated. The batch is purified on a centrifuge train where the brine phase is separated and the polymer solution in methylene chloride is extracted with aqueous HCl and then washed with deionized water until titratable chlorides are less than 5 ppm. The methylene chloride solution is then steam precipitated and the polymer dried under hot nitrogen until volatile levels are <0.4 wt %. The prepared poly(ester-carbonate) copolymer contained less than 100 ppm of each of the monomers. The ionic Cl is less than 2 ppm. The residual TEA is less than 4 ppm.

Comparative B Process. The TMC/BPA poly(ester-carbonate) copolymers are prepared according to U.S. Pat. No. 8,487,065 B2 Example 7. The amounts are adjusted according to the desired composition and Mw.

Examples and Comparative Examples 1-25

Various poly(ester-carbonate) copolymers are prepared according to Example Process A. The compositions and the possible properties of the poly(ester-carbonate) copolymers are shown in Table 2.

Examples 26 and 27

Poly(ester-carbonate) copolymers are compounded with a lubricant, phosphite stabilizer, and a hindered phenol antioxidant. The compositions and their possible properties are shown in Tables 6 and 7.

TABLE 6

| Example | | 26 | 27 |
|---|---|---|---|
| TMC | Mol % | 46 | 46 |
| Ester | Mol % | 52 | 52 |
| Mw, powder | Daltons | 23000 | 19300 |
| Tg, Powder | ° C. | 229 | 225 |

TABLE 2

| Examples | TMC mol % | Ester mol % | Mw Powder | MVR (g/cc) 337 6.7 360 s | MVR (g/cc) 337 6.7 1800 s | Shift % | Melt Visc. 350° C. 644 s−1 Pa·s | Tg ° C. | HDT (ASTM) 1.82 GPa ° C. | HDT (ASTM) 0.455 GPa ° C. |
|---|---|---|---|---|---|---|---|---|---|---|
| 1 | 46 | 52 | 19,003 | 17.7 | 18.0 | 1.7 | 731 | 224 | 199 | 213 |
| 2 | 50 | 52 | 19,279 | 13.6 | 13.9 | 2.2 | 830 | 226 | 195 | 213 |
| 3 | 46 | 58 | 19,056 | 10.6 | 11.1 | 4.7 | 923 | 225 | 201 | 215 |
| Comp Ex 4 | 50 | 58 | 19,166 | 6.8 | 7.7 | 12.6 | 1175 | 230 | 204 | 220 |
| Comp Ex 5 | 46 | 52 | 22,914 | 5.1 | 5.3 | 2.9 | 1336 | 228 | 202 | 219 |
| Comp Ex 6 | 50 | 52 | 23,192 | 5.0 | 5.9 | 17.6 | 1290 | 234 | 205 | 222 |
| Comp Ex 7 | 46 | 58 | 22,936 | 4.8 | 4.8 | 1.3 | 1407 | 231 | 204 | 221 |
| Comp Ex 8 | 50 | 58 | 23,047 | 3.9 | 4.0 | 2.6 | High | 235 | 207 | 224 |
| 13 | 48 | 55 | 17,744 | 22.5 | 23.1 | 2.7 | 681 | 223 | 205 | 213 |
| Comp Ex14 | 48 | 55 | 23,673 | 9.7 | 9.4 | −2.9 | 1297 | 236 | 202 | 219 |
| 15 | 48 | 55 | 20,951 | 10.4 | 11.0 | 5.8 | 915 | 227 | 206 | 218 |
| 16 | 48 | 55 | 20,951 | 10.4 | 11.4 | 9.6 | 984 | 226 | 202 | 218 |
| 17 | 48 | 55 | 20,951 | 10.9 | 10.3 | −5.5 | 981 | 229 | 203 | 218 |
| Comp Ex18 | 48 | 55 | 20,951 | 11.0 | 11.0 | 0.0 | 1016 | 228 | 203 | 218 |
| 19 | 48 | 55 | 20,951 | 13.3 | 11.0 | 17.3 | 992 | 226 | 202 | |
| 20 | 48 | 55 | 20,951 | 11.8 | 11.9 | 0.8 | 914 | 226 | 200 | 217 |
| 21 | 42 | 44 | 22,853 | | | | | 220 | | |
| 22 | 46 | 44 | 19,270 | | | | | 222 | | |
| 23 | 42 | 44 | 19,034 | | | | | 209 | | |
| 25 | 42 | 58 | 21,731 | | | | | 222 | | |
| U.S. Pat. No. 8,318,891 Ex 1 | 25 | 90 | 28,808 | | | | | 219 | | |
| U.S. Pat. No. 8,318,891 Ex 2 | 38 | 31 | 28,276 | | | | | 205 | | |
| U.S. Pat. No. 8,487,065 Ex 7 | 50 | 68 | 23163 | | | | | 246 | | |

U.S. Pat. Nos. 8,318,891 and 8,487,065 discloses poly(ester-carbonate) copolymers having high glass transition temperatures, but lack teaching on providing high flow thermoplastic compositions that are suitable to provide thin wall articles.

The composition shown in Example 1 of U.S. Pat. No. 8,318,891 has a suitable glass transition temperature of 219° C., but the composition has inadequate melt flow.

The composition shown in Example 2 of U.S. Pat. No. 8,318,891 has a glass transition temperature of 205° C., which is too low for certain applications. The composition also has low melt flow properties.

The composition shown in Example 7 of U.S. Pat. No. 8,487,065 has a glass transition temperature of 246° C., which is too high for certain applications and because of its high Tg has poor melt flow and therefore will not fill thin wall parts. The composition also has low melt flow.

TABLE 6-continued

| Example | | | 26 | 27 |
|---|---|---|---|---|
| Formulation | | | | |
| Lubricant | | % | 0.27 | 0.27 |
| Phosphite Stabilizer | | % | 0.08 | 0.08 |
| Hindered phenol | | % | 0.04 | 0.04 |
| Mw, Pellets | | Daltons | 20600 | 18900 |
| Tg, Pellets | | ° C. | 226 | 222 |
| Properties | Test Description | Unit | 26 | 27 |
| Melt Viscosity, 350° C., 644 s−1 | ISO11443 | | 855.5 | 686 |
| Melt Viscosity, 370° C., 644 s−1 | ISO11443 | | 466.7 | 368.7 |
| Melt Stability at 330° C., 1800 s | Viscosity Shift | % | −8 | −4 |

TABLE 6-continued

| Example | | | 26 | 27 |
|---|---|---|---|---|
| Melt Stability at 350° C., 1800 s | Viscosity Shift | % | −21 | −17 |
| Melt Stability at 370° C., 1800 s | Viscosity Shift | % | −38 | −29 |

TABLE 7

| Example | | 26 | 27 | PEI | PES |
|---|---|---|---|---|---|
| % Mol % PPP | Mol % | 46 | 46 | | |
| Mol % Ester | Mol % | 52 | 52 | | |
| Mw, Powder | Daltons | 23000 | 19300 | | |
| Tg, Powder | ° C. | 229 | 225 | | |
| Formulation | | | | | |
| Lubricant | % | 0.27 | 0.27 | | |
| Phosphite stabilizer | % | 0.08 | 0.08 | | |
| Hindered phenol | % | 0.04 | 0.04 | | |
| Mw, Pellets | Daltons | 20600 | 18900 | | |
| Tg, Pellets | ° C. | 226 | 222 | | |
| Melt Flow & Viscosity | | | | | |
| MVR-ISO 340° C., 5 Kg | cm³/10 min | 17.8 | 15.4 | 12.7 | |
| Thermal Properties | Unit | | | | |
| HDT-ISO 0.45 Mpa, Flat | | 204 | 205 | 201 | |
| HDT-ISO 1.8 Mpa, Flat | | 185 | 187 | 186 | |
| Metallized Article Performance | | | | | |
| Defect Onset Temperature | ° C. | 210 | 205 | 204 | 210 |

Examples 26 and 27 of Table 6 show that poly(ester-carbonate) copolymers can be compounded into thermoplastic formulations can have glass transition temperatures above 210° C. and melt viscosities below 1000 Pas at 350° C. and 644 s$^{-1}$ as well as good melt stability at 350° C. (viscosity shift less than 40%).

Table 7 shows that the poly(ester-carbonate) compositions can not only have good flow and heat resistance compared to benchmark materials in the industry, but can also have comparable defect onset temperatures (DOT). The defect onset temperatures of the poly(ester-carbonate) compositions of the disclosure are within 10 degrees (° C.) of the HDT (0.45 MPa) indicating that the adhesion to the metal surface can be excellent and the compositions can have low water absorption.

Set forth below are various embodiments of the disclosure, which are not limiting.

Embodiment 1

A poly(ester-carbonate) copolymer, comprising carbonate units of the formula (1); and ester units of the formula (2) wherein: T is a $C_{2-20}$ alkylene, a $C_{6-20}$ cycloalkylene, or a $C_{6-20}$ arylene; and $R^1$ and J are each independently (a) a bisphenol A divalent group, and (b) a $C_{16}$ or higher divalent group of the formula (4), (5), (16), (17), or (6), wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, a -$(Q^1)_x$-G-$(Q^2)_y$- group wherein $Q^1$ and $Q^2$ are each independently a $C_{1-3}$ alkylene, G is a $C_{3-10}$ cycloalkylene, x is 0 or 1, and y is 1, and m and n are each independently 0 to 4; wherein the $C_{16}$ or higher divalent group (b) is present in an amount of 40 mol % to 50 mol % based on the total moles of the bisphenol A divalent groups and the $C_{16}$ or higher divalent group; the ester units are present in an amount of 40 mol % to 60 mol % based on the sum of the moles of the carbonate units and the ester units; the poly (ester-carbonate) copolymer has a weight average molecular weight of 18,000 Daltons to 24,000 Daltons, as measured by gel permeation chromatography, using a crosslinked styrene-divinylbenzene column and calibrated to bisphenol A homopolycarbonate references; and a sample of the composition has a glass transition temperature of 210° C. to 235° C. as determined by differential scanning calorimetry (DSC) as per ASTM D3418 with a 20° C./min heating rate; and a melt viscosity of less than 1050 Pa·s at 644 sec$^{-1}$ and 350° C., determined according to ISO11443.

Embodiment 2

The poly(ester-carbonate) copolymer of Embodiment 1, having one or more of the following properties: a shift in melt viscosity of less than 25% at 350° C. over 30 min under a nitrogen atmosphere as measured in a small amplitude oscillatory time sweep rheology at a fixed angular frequency of 10 radians/sec; a glass transition temperature of 220° C. to 235° C. as determined by differential scanning calorimetry (DSC) as per ASTM D3418 with a 20° C./min heating rate; a Vicat B120 of 220 to 225° C., measured according to ISO 306; a melt viscosity of less than 1000 Pa·s at 644 sec$^{-1}$ and 350° C., determined according to ISO11443; or a yellowness index of less than 18 determined in accordance with ASTM D1925.

Embodiment 3

The poly(ester-carbonate) copolymer of Embodiment 1 or Embodiment 2, wherein $R^1$ and J are each independently the bisphenol A divalent group or the $C_{16}$ or higher divalent group; and at least a portion of the J groups are the $C_{16}$ or higher divalent group.

Embodiment 4

The poly(ester-carbonate) copolymer of any one or more of Embodiments 1 to 3, wherein greater than 20 mol % and less than 35 mol % of the J groups are the $C_{16}$ or higher group based on the total moles of the J groups.

Embodiment 5

The poly(ester-carbonate) copolymer of any one or more of Embodiments 1 to 4, wherein T is a $C_{6-20}$ divalent aromatic group.

Embodiment 6

The poly(ester-carbonate) copolymer of any one or more of Embodiments 1 to 4, wherein T is a divalent isophthaloyl group, a divalent terephthaloyl group, or a combination thereof.

Embodiment 7

The poly(ester-carbonate) copolymer of any one or more of Embodiments 1 to 6, wherein the $C_{16}$ or higher divalent group has the formula (6a)-(6i).

Embodiment 8

The poly(ester-carbonate) copolymer of any one or more of claims 1 to 7, wherein the $C_{16}$ or higher divalent group is derived from 1,1-bis(4-hydroxyphenyl)-3,3,5-trimethyl-cyclohexane, 1,1-bis(4-hydroxy-3-methylphenyl)cyclohexane, or a combination thereof.

Embodiment 9

A thermoplastic composition comprising the poly(ester-carbonate) copolymer of any one or more of Embodiments 1 to 8.

Embodiment 10

The thermoplastic composition of Embodiment 9 further comprising a polycarbonate homopolymer, preferably a bisphenol A homopolycarbonate, a second poly(ester-carbonate) different from the poly(ester-carbonate) copolymer, a copolycarbonate, or a combination comprising at least one of the foregoing.

Embodiment 11

The thermoplastic composition of any one or more of Embodiments 9 to 10, wherein the composition has a haze of less than 15% and a transmission greater than 75%, each measured in accordance with ASTM D1003 using the color space CIE1931 (Illuminant C and a 2° observer) at a 3.2 mm thickness.

Embodiment 12

The poly(ester-carbonate) copolymer or the thermoplastic composition of any one or more of Embodiments 1 to 11, wherein a metalized sample of the poly(ester-carbonate) copolymer or the thermoplastic composition has a defect onset temperature that is within 10 degrees Celsius of the heat deflection temperature of the poly(ester-carbonate) copolymer or the thermoplastic composition measured flat on a 80×10×4 mm bar with a 64 mm span at 0.45 MPa according to ISO 75/Bf.

Embodiment 13

The poly(ester-carbonate) copolymer or the thermoplastic composition of any one or more of Embodiments 1 to 12, wherein a metalized sample of the poly(ester-carbonate) copolymer or the thermoplastic composition has a defect onset temperature of 200 to 220° C.

Embodiment 14

The poly(ester-carbonate) copolymer or the thermoplastic composition of any one or more of Embodiments 1 to 13, wherein the poly(ester-carbonate) copolymer or the thermoplastic composition at a given temperature has a melt viscosity of less than 1050 Pa·s at 644 sec$^{-1}$ and has a shift in melt viscosity of less than 25% at the given temperature over 30 min under a nitrogen atmosphere as measured in a small amplitude oscillatory time sweep rheology at a fixed angular frequency of 10 radians/sec.

Embodiment 15

The poly(ester-carbonate) copolymer or the thermoplastic composition of any one or more of Embodiments 1 to 14, wherein the copolymer or the composition has a melt flow rate of 10 to 30 cm$^3$/10 minutes measured at 330° C. under a load of 2.16 kg in accordance with ASTM D1238-04.

Embodiment 16

An article comprising the copolymer or composition of any one or more of Embodiments 1 to 15, wherein the article is a molded article, a thermoformed article, an extruded film, an extruded sheet, one or more layers of a multi-layer article, a substrate for a coated article, or a substrate for a metallized article.

Embodiment 17

The article of Embodiment 16, wherein the article is a metallized article comprising the copolymer or composition of any one or more of Embodiments 1 to 15, wherein the defect onset temperature of the metallized article is within 10° C. of the heat deflection temperature of the copolymer or the composition measured flat on a 80×10×4 mm bar with a 64 mm span at 0.45 MPa according to ISO 75/Bf.

Embodiment 18

The article of Embodiment 17, comprising a substrate comprising the copolymer or composition of any one or more of Embodiments 1-15; and a metal layer disposed on at least one side of the substrate.

Embodiment 19

The article of Embodiment 18, further comprising a protective layer disposed on the metal layer.

A method for the manufacture of the poly(ester-carbonate) copolymer of any one or more of Embodiments 1 to 8, the method comprising: providing a slurry comprising water, a water-immiscible organic solvent, a phase transfer catalyst, and bisphenol A; co-feeding to the slurry a solution comprising aqueous NaOH or aqueous KOH, an aromatic dicarboxylic halide of the formula

wherein T is a $C_{2-20}$ alkylene, a $C_{6-20}$ cycloalkylene, or a $C_{6-20}$ arylene, preferably a $C_{6-20}$ arylene p, and a dihydroxy compound of the formula

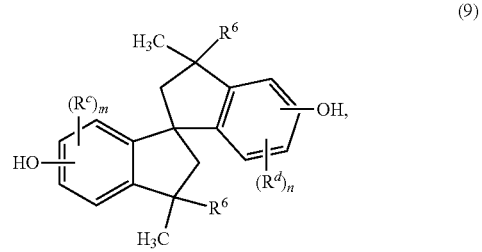

(9)

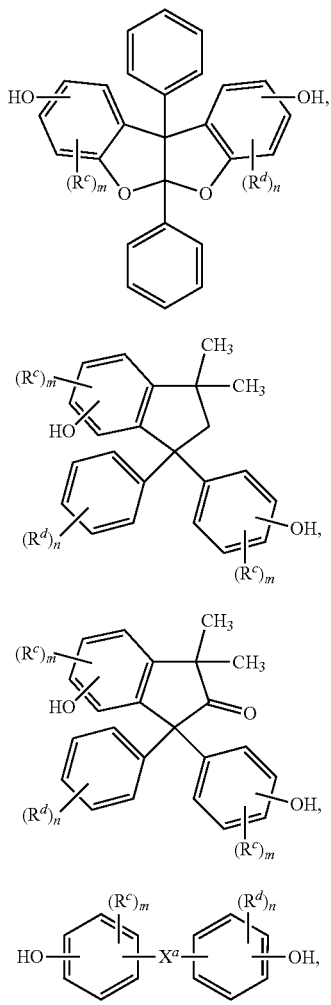

or a combination comprising at least one of the foregoing, wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, and m and n are each independently 0 to 4, to provide a polyester oligomer; and reacting the polyester oligomer with a carbonate source to provide the poly(ester-carbonate).

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms; "cycloalkylene" refers to a divalent group formed by the removal of two hydrogen atoms from two different carbon atoms on one or more rings of a cycloalkyl group; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Groups that can be present on a substituted position include a nitro functional group (—NO$_2$), cyano (—CN), hydroxy (—OH), halogen, thiol (—SH), thiocyano (—SCN), $C_{2-6}$ alkanoyl (e.g., acyl (H$_3$CC(=O)—); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 1 to 3 separate or fused rings and from 6 to 18 ring carbon atoms.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A poly(ester-carbonate) copolymer, comprising carbonate units of the formula $$-R^1-O-\overset{O}{\underset{\|}{C}}-O-;$$

and ester units of the formula $$-\overset{O}{\underset{\|}{C}}-T-\overset{O}{\underset{\|}{C}}-O-J-O-$$

wherein:

T is a $C_{2-20}$ alkylene, a $C_{6-20}$ cycloalkylene, or a $C_{6-20}$ arylene; and $R^1$ and J are each independently (a) a bisphenol A divalent group of the formula

[structure]

and (b) a $C_{16}$ or higher divalent group (b) of the formula

[structures]

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, a $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1, and m and n are each independently 0 to 4;

provided that the $C_{16}$ or higher divalent group (b) is present in an amount of 40 mol % to 50 mol % based on the total moles of the bisphenol A divalent groups and the $C_{16}$ or higher divalent groups;

the ester units are present in an amount of 40 mol % to 60 mol % based on the sum of the moles of the carbonate units and the ester units; and wherein the poly(ester-carbonate) copolymer has a weight average molecular weight of 18,000 Daltons to 24,000 Daltons, as measured by gel permeation chromatography, using a crosslinked styrene-divinylbenzene column and calibrated to bisphenol A homopolycarbonate references; and a sample of the composition has a glass transition temperature of 210° C. to 235° C. as determined by differential scanning calorimetry (DSC) as per ASTM D3418 with a 20° C./min heating rate; and a melt viscosity of less than 1050 Pa·s at 644 $sec^{-1}$ and 350° C., determined according to ISO11443.

2. The poly(ester-carbonate) copolymer of claim 1, having one or more of the following properties:

a shift in melt viscosity of less than 25% at 350° C. over 30 min under a nitrogen atmosphere as measured in a small amplitude oscillatory time sweep rheology at a fixed angular frequency of 10 radians/sec;

a glass transition temperature of 220° C. to 235° C. as determined by differential scanning calorimetry (DSC) as per ASTM D3418 with a 20° C./min heating rate;

a Vicat B120 of 220 to 225° C., measured according to ISO 306;

a melt viscosity of less than 1000 Pa·s at 644 $sec^{-1}$ and 350° C., determined according to ISO11443; or a yellowness index of less than 18 determined in accordance with ASTM D1925.

3. The poly(ester-carbonate) copolymer of claim 1, wherein

R¹ and J are each independently the bisphenol A divalent group or the $C_{16}$ or higher divalent group; and at least a portion of the J groups are the $C_{16}$ or higher divalent group.

4. The poly(ester-carbonate) copolymer of claim 1, wherein greater than 20 mol % and less than 35 mol % of the J groups are the $C_{16}$ or higher group based on the total moles of the J groups.

5. The poly(ester-carbonate) copolymer of claim 1, wherein T is a $C_{6-20}$ divalent aromatic group.

6. The poly(ester-carbonate) copolymer of claim 1, wherein T is a divalent isophthaloyl group, a divalent terephthaloyl group, or a combination thereof.

7. The poly(ester-carbonate) copolymer of claim 1, wherein the $C_{16}$ or higher divalent group has the formula:

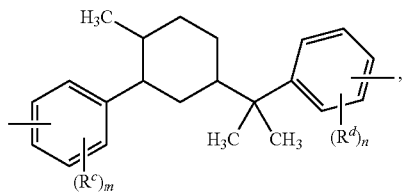

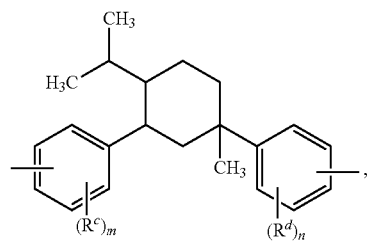

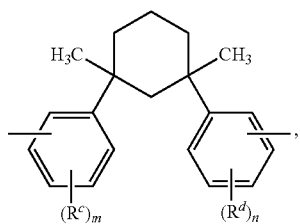

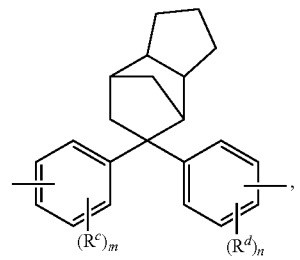

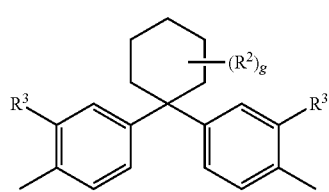

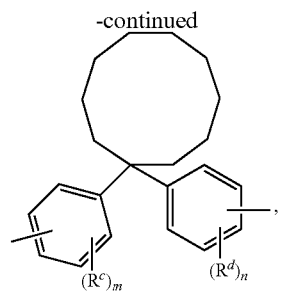

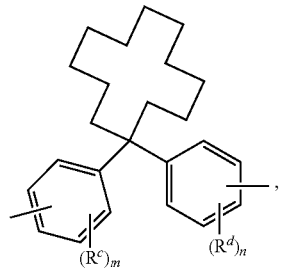

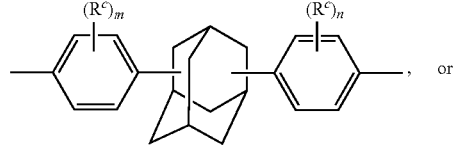

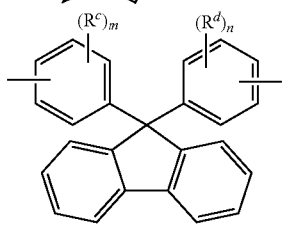

wherein
$R^c$ and $R^d$ are each independently $C_{1-3}$ alkyl or phenyl,
each $R^2$ is independently hydrogen or $C_{1-4}$ alkyl,
m and n are each independently 0 to 4,
each $R^3$ is independently $C_{1-4}$ alkyl or hydrogen, and
g is 0 to 10.

8. The poly(ester-carbonate) copolymer of claim 1, wherein the $C_{16}$ or higher divalent group is derived from 1,1-bis(4-hydroxyphenyl)-3,3,5-trimethyl-cyclohexane, 1,1-bis(4-hydroxy-3-methylphenyl)cyclohexane, or a combination thereof.

9. A thermoplastic composition comprising the poly(ester-carbonate) copolymer of claim 1.

10. The thermoplastic composition of claim 9, further comprising a polycarbonate homopolymer, a second poly(ester-carbonate) different from the poly(ester-carbonate) copolymer, a copolycarbonate, or a combination comprising at least one of the foregoing.

11. The thermoplastic composition of claim 9, wherein the composition has a haze of less than 15% and a transmission greater than 75%, each measured in accordance with ASTM D1003 using the color space CIE1931 (Illuminant C and a 2° observer) at a 3.2 mm thickness.

12. The poly(ester-carbonate) copolymer of claim 1, wherein a metalized sample of the poly(ester-carbonate) copolymer has a defect onset temperature that is within 10 degrees Celsius of the heat deflection temperature of the poly(ester-carbonate) copolymer measured flat on a 80×10×4 mm bar with a 64 mm span at 0.45 MPa according to ISO 75/Bf.

13. The poly(ester-carbonate) copolymer of claim 1, wherein a metalized sample of the poly(ester-carbonate) copolymer has a defect onset temperature of 200 to 220° C.

14. The poly(ester-carbonate) copolymer of claim 1, wherein the poly(ester-carbonate) copolymer at a given temperature has a melt viscosity of less than 1050 Pa·s at 644 sec$^{-1}$ and has a shift in melt viscosity of less than 25% at the given temperature over 30 min under a nitrogen atmosphere as measured in a small amplitude oscillatory time sweep rheology at a fixed angular frequency of 10 radians/sec.

15. The poly(ester-carbonate) copolymer of claim 1, wherein the copolymer has a melt flow rate of 10 to 30 cm$^3$/10 minutes measured at 330° C. under a load of 2.16 kg in accordance with ASTM D1238-04.

16. An article comprising the copolymer of claim 1, wherein the article is a molded article, a thermoformed article, an extruded film, an extruded sheet, one or more layers of a multi-layer article, a substrate for a coated article, or a substrate for a metallized article.

17. The article of claim 16, wherein the article is a metallized article comprising the copolymer, wherein the defect onset temperature of the metallized article is within 10° C. of the heat deflection temperature of the copolymer measured flat on a 80×10×4 mm bar with a 64 mm span at 0.45 MPa according to ISO 75/Bf.

18. The article of claim 17, comprising
a substrate comprising the copolymer; and
a metal layer disposed on at least one side of the substrate.

19. The article of claim 18, further comprising a protective layer disposed on the metal layer.

20. A method for the manufacture of the poly(ester-carbonate) copolymer of claim 1, the method comprising:
providing a slurry comprising water, a water-immiscible organic solvent, a phase transfer catalyst, and bisphenol A;
co-feeding to the slurry a solution comprising aqueous NaOH or aqueous KOH, an aromatic dicarboxylic halide of the formula

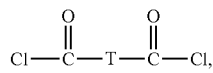

wherein T is a C$_{2-20}$ alkylene, a C$_{6-20}$ cycloalkylene, or a C$_{6-20}$ arylene, and
a dihydroxy compound of the formula (9)

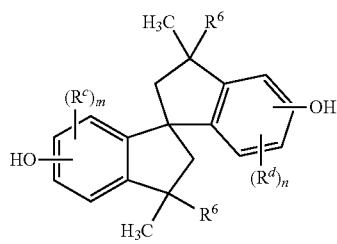

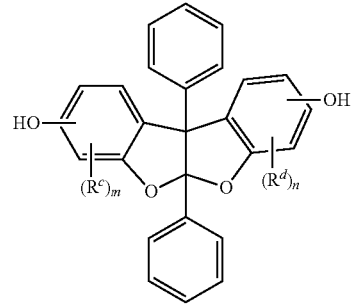

(10)

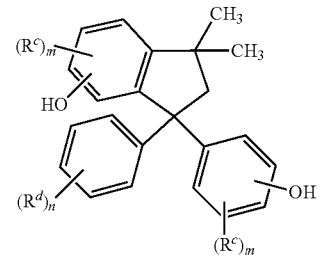

(12)

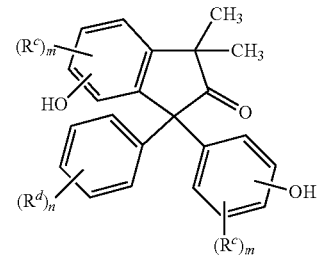

(13)

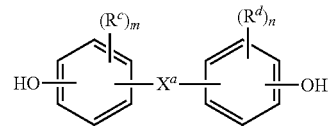

(11)

or a combination comprising at least one of the foregoing, wherein
R$^c$ and R$^d$ are each independently a C$_{1-12}$ alkyl, C$_{2-12}$ alkenyl, C$_{3-8}$ cycloalkyl, or C$_{1-12}$ alkoxy,
each R$^6$ is independently C$_{1-3}$ alkyl or phenyl, and
m and n are each independently 0 to 4
to provide a polyester oligomer; and
reacting the polyester oligomer with a carbonate source to provide the poly(ester-carbonate).

* * * * *